Dec. 15, 1942.   K. STROBEL   2,305,206
METHOD OF ELECTRIC ARC WELDING AND APPARATUS THEREFOR
Filed April 30, 1940.   2 Sheets-Sheet 1

KARL STROBEL
INVENTOR
By Harold W. Mattingly
ATTORNEY

Dec. 15, 1942.   K. STROBEL   2,305,206
METHOD OF ELECTRIC ARC WELDING AND APPARATUS THEREFOR
Filed April 30, 1940   2 Sheets-Sheet 2

KARL STROBEL
INVENTOR

By Harold W. Mattingly
ATTORNEY

Patented Dec. 15, 1942

2,305,206

UNITED STATES PATENT OFFICE 2,305,206

METHOD OF ELECTRIC ARC WELDING AND APPARATUS THEREFOR

Karl Strobel, Whittier, Calif., assignor to Stroco Products, Inc., Los Angeles, Calif., a corporation of California Application April 30, 1940, Serial No. 332,488

8 Claims. (Cl. 219—10)

My invention relates to a method of electric arc welding and apparatus therefor and has particular reference to a method and apparatus for preventing the formation of a crater at the conclusion of any one welding operation.

In the art of electric arc welding the two pieces to be welded together are bonded to each other by fusing a like material to each of the pieces, the heat required for the fusing of the metals being obtained from an electric arc which is established between the parent metal pieces and an electrode which forms one terminal of a suitable source of electric current, the parent metal forming the other terminal. The arc which is established between the electrode and the parent metal causes a local heating of the parent metal to a temperature above its melting point and at the same time similarly raises the temperature of the extreme arcing end of the electrode to above the melting temperature of the electrode. This results in metal being deposited from the electrode to the parent metal and since the electrode metal is deposited on the parent metal when both metals are in a molten condition, a considerable amount of inter-mixing occurs so that the joint which is gradually built up of metal deposited from the electrode is bonded to the parent metal by an intermediate zone composed of a solution of these two metals.

It has been found that whenever such a welding operation is terminated, as by removing the electrode from the vicinity of the parent metal so as to increase the arcing distance sufficiently to break the arc, there will be formed at the end of the welded bead a depression or "crater." Experience has shown that this crater is a source of considerable weakness in the weld, and exhaustive investigations have indicated that this weakness is caused by a porosity in the metallic structure which is caused by atmospheric action upon the molten metal and also by inclusions of various foreign substances, such as scale and the like. Furthermore, during the welding operation the temperature of the molten metal is raised to such a high value that at least a part of it tends to boil and the flux which is used in connection with the welding operation to prevent undue oxidation of the molten metal also boils at this temperature.

When the arc is abruptly terminated, as is the current practice today, the molten metal cools and freezes so rapidly that the bubbles resulting from such boiling have no opportunity to escape with the result that there are pockets and voids left in the end of the welded bead in the immediate vicinity of the crater. Further study has led some investigators to believe that the crater may be caused either by the surface tension of the molten metal or by the dispersing effect of the impact of the metal which is being deposited from the electrode or by a combination of both of these effects.

Many attempts have been made in the past to prevent the formation of this crater at the end of a weld bead so as to eliminate the weaknesses in the welded structure which are caused thereby. Among these attempts may be included the addition of certain reagents or metals to the welding flux and to the welding electrode in an attempt to reduce the surface tension of the molten metal to a point sufficiently low to prevent the formation of the crater. It has been found, however, that any agency which may be added to either the flux or the electrode seriously impairs the welding operation and seriously weakens the metals which are applied so that in preventing the formation of the crater the attempt results in a weakening of the entire welded structure.

Others have attempted to prevent the formation of the crater by conducting a welding operation in an atmosphere of inert gas. The investigations along this line have indicated that this expedient is not only unsatisfactory but is conducive to extremely high cost in the operation of forming welded structures for the reason that it is substantially impossible to carry on a welding operation in an atmosphere which is composed solely of such inert gas. Other attempts, such as the short circuiting of the arc, have also been either unsuccessful in preventing the formation of the crater, or in that the weld is so weakened by the methods employed to eliminate the crater that all of the advantages of crater elimination are more than outweighed by the disadvantages resulting from the use of the process.

It is accordingly an object of my invention to provide an arc welding apparatus which operates to prevent the formation of a crater at the termination of a welding operation and which operates to prevent such formation without in any way effecting the character of the weld up to the point of termination.

It is a still further object of my invention to provide a device of the character set forth which may be inexpensively constructed as an attachment for existing arc welding machines.

It is an additional object of my invention to provide an apparatus of the character set forth which includes a means for gradually reducing the heat of the welding arc to a sufficiently low value to permit the breaking of that arc without forming a crater in the parent metal.

It is also an object of my invention to provide an apparatus of the character set forth in the preceding paragraph wherein the reduction in arcing is obtained by reducing the amount of current flowing in the arc.

It is an adidtional object of my invention to provide an apparatus of the character set forth in the preceding paragraph which includes also a means for maintaining the arc voltage at a substantially constant value during the time the arc current is being reduced.

It is also an object of my invention to provide an apparatus of the character set forth in the preceding paragraphs in which a means is provided for permitting manual control of the apparatus so that a welding operator may terminate a welding operation without forming a crater at any time he desires.

It is an additional object of my invention to provide a method of preventing the formation of a crater at the conclusion of a welding operation which consists in uniformly reducing the heat of the arc from the normal welding heat to a negligible value.

It is a still further object of my invention to provide a method of the character set forth in the preceding paragraph in which the arc voltage is maintained substantially constant during the time the heat of the welding arc is being reduced.

Other objects and advantages of my invention will be apparent from a study of the following specifications, read in connection with the accompanying drawings, wherein.

Figure 4:
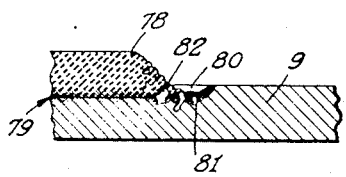
Figure 5:
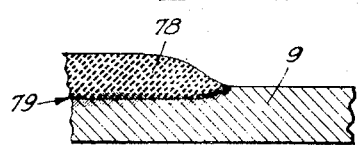

Fig. 4 is a diagrammatic view representing a longitudinal section taken through a weld bead near the end thereof and illustrating the appearance of the crater which is formed therein, the character of the welded joint, and the source of weaknesses in the weld; and Fig. 5 is a view similar to Fig. 4 but illustrating the appearance of a weld produced by a welder employing the crater eliminating apparatus of my invention.

I have found that the crater which is normally formed by the breaking of the welding arc may be eliminated by gradually reducing the heat of the arc to a very low value before the arc is broken. In order to accomplish this it is necessary that the heat of the arc be reduced very smoothly and without fluctuations otherwise the arc would tend to become unstable and blow itself out. I have also found that it is necessary to maintain the voltage across the arc substantially constant irrespective of changes in the current in order to prevent the arc from automatically extinguishing itself. The current which is drawn by the arc and consequently the heat of the arc itself may be reduced by employing a suitable current control means for that purpose. Such current control means may operate to reduce the excitation of the welding generator. The form of device which I have illustrated herein includes a motor operated rheostat which is under the control of an operator employing the welding generator for slowly and smoothly reducing the shunt field excitation of the generator in such a manner as to smoothly reduce the welding current to substantially zero while maintaining the arc voltage at a substantially constant value.

Figure 1:
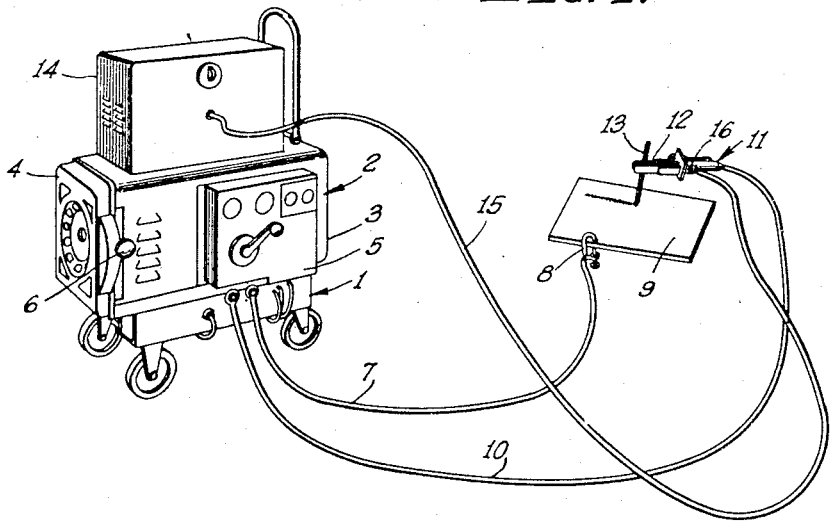
Fig. 1 is a perspective view of one well known form of electric arc welding apparatus and illustrating the manner in which the crater eliminating apparatus of my invention may be employed as an attachment therefor.

Referring to the drawings, I have illustrated in Fig. 1 a common form of electric arc welding apparatus which may include a hand truck 1 upon which is mounted a motor generator set 2. The motor generator set 2 includes an electric motor section 3 which is drivably coupled to a welding generator section 4. The device is usually fitted with a control panel 5 permitting the starting and stopping of the driving motor 3, the reversing of polarity on the welding generator 4, and such other operations as are usual and customary in electric arc welding. The welding generator 4 is usually provided with an adjustment handle 6 by means of which the normal arc current which is supplied by the generator 4 may be set at any desired value.

One terminal of the welding generator 4 is connected as by means of a welding cable 7 and a clamp 8 to the workpiece or parent metal 9 upon which the welding operation is to be performed. The other terminal of the generator 4 is connected by means of a welding cable 10 to an electrode holder 11, the electrode holder 11 being provided with an electrically conductive clamping device in which the welding electrode 13 may be clamped.

I have illustrated in Fig. 1 the appearance of one form of crater eliminating device of my invention. This device may include a housing 14 within which are enclosed various instrumentalities to be described hereinafter, the housing 14 being secured to the motor generator set 2 so as to permit electrical interconnection between the instrumentalities disposed within the housing and the various circuits of the welding generator which are controlled thereby. A control connection comprising a control conductor 15 is extended from the mechanism enclosed within the housing 14 to a remote control mechanism 16 which is preferably mounted upon the handle of the electrode holder 11 so as to permit ready manual operation thereof by a welder at any time he desires, but which may comprise a foot-operated mechanism or such other form of control device as is convenient for operation by a welding operator.

Figure 3:
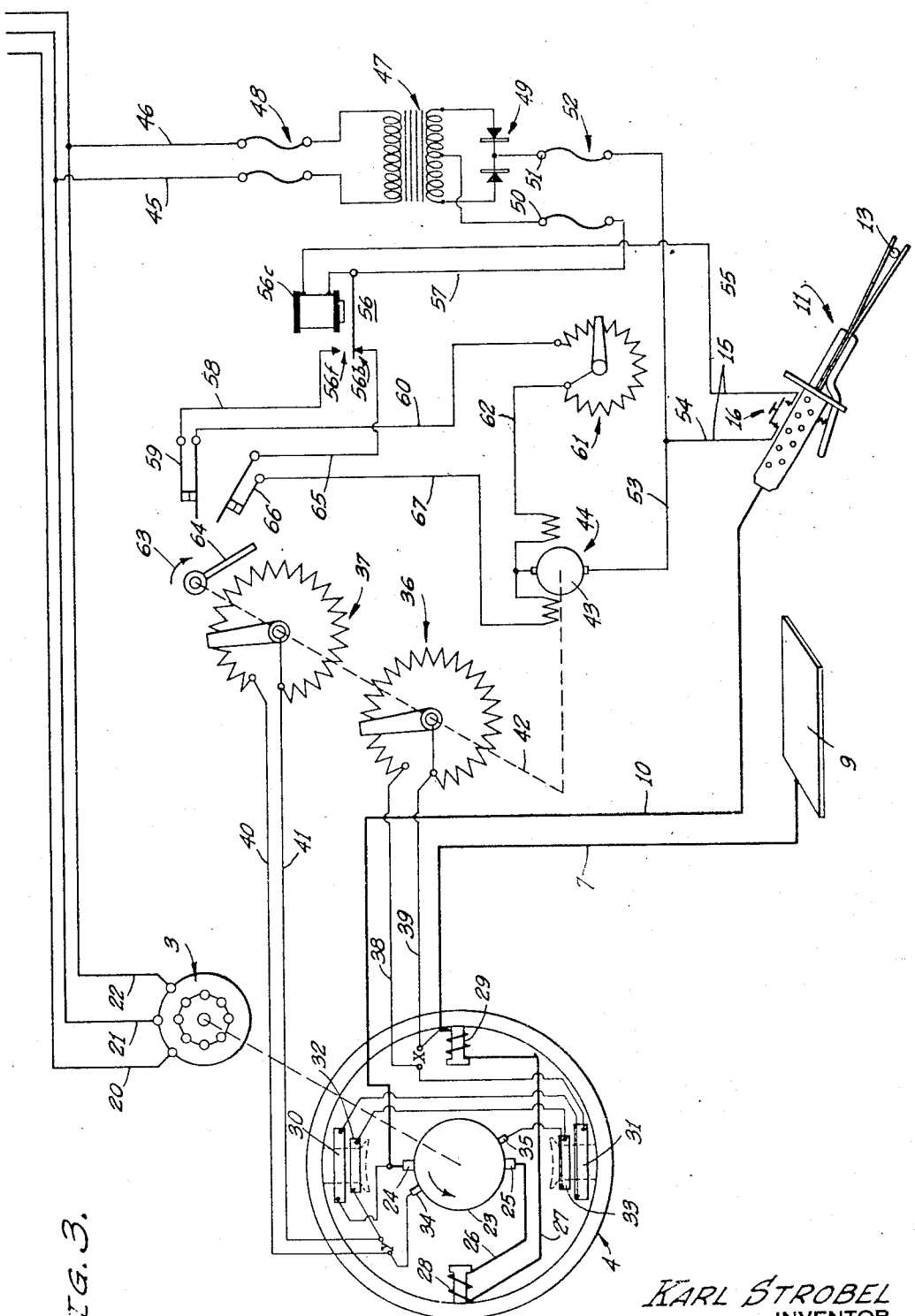
Fig. 3 is a wiring diagram illustrating the electrical circuits employed in connection with the apparatus of my invention.

The instrumentalities which are enclosed within the housing 14 and the manner of their interconnection with the welding generator 4 is perhaps best illustrated in the wiring diagram Fig. 3 wherein the electric driving motor 3 is illustrated as being of the three-phase, squirrel-cage induction type deriving power for its operation from suitable supply conductors 20, 21 and 22.

I have also illustrated in this figure a conventional form of welding generator 4 which includes an armature coupled for rotation by the electric motor 3. The various armature windings are suitably connected to a commutator 23 upon which bear main brushes 24 and 25. One of the main brushes, such as brush 24 is connected by means of the aforementioned welding conductor 10 to the welding electrode 12 and the other main brush 25 is connected by means of conductors 26 and 27 through series field coils 28 and 29 to the aforementioned welding conductor 7 which is in turn connected to the parent metal 9. The series field coils 28 and 29 and the pole pieces associated therewith are so disposed relative to the main field of the generator as to cause the generator to supply a substantially constant current irrespective of the arc resistance.

The main excitation for the generator is obtained by means of main shunt field coils 30, 31 and auxiliary shunt field coils 32, 33. Excitation for the main field coils is normally obtained by connecting these coils in series and by connecting the series connected coils directly across the main welding leads 7 and 10. The auxiliary field coils 32, 33 are similarly connected in series but obtain their excitation from a pair of auxiliary brushes 34 and 35. These brushes are mounted for mechanical movement relative to the main brushes 24 and 25, the aforementioned adjustment handle 6 being provided for shifting the position of these brushes. As is well known the position of the brushes 34—35 relative to the main flux which is generated by the main field coils 30—31 and the amount of cross magnetization afforded by the series field coils 28 and 29 determines the value of the constant current which will be generated by the generator 4.

One suitable form of current control means for preventing the formation of craters at the conclusion of a welding operation may comprise a pair of variable resistances 36 and 37. I have, furthermore, found that if these resistances be connected in series with the main field coils 30—31 and the auxiliary field coils 32—33, respectively, simultaneous variation of these resistances will cause the current which is drawn by a welding arc established between the electrode 13 and the parent metal 9 to be accordingly varied but that the voltage which is maintained across this welding arc will be unaffected by such current changes.

The connection of the rheostat 36 into the circuit of the main field 30—31 may be effected as by opening the circuit for this field as indicated at X in Fig. 3 and extending each of the conductors as by extensions 38 and 39 to the variable resistance 36, the extension conductor 38 being connected to the resistance strip portion and the conductor 39 being connected to the movable arm of the rheostat 36. Similarly, the rheostat 37 may be connected in series with the supply for auxiliary field coils 32—33 as by opening the circuit for these coils at the point Y in Fig. 3 and extending these conductors by means of extensions 40 and 41, the conductor 40 being connected to the resistance portion of the rheostat 37 and the conductor 41 being connected to the movable arm thereof.

Simultaneous variation of the resistance in these circuits may be obtained by connecting each of the movable arms of the rheostats 36 and 37 to a drive shaft 42 which is in turn coupled to the armature 43 of an electric driving motor 44. Power for operating the motor 44 may be obtained from the same source of electrical potential as is used to supply the induction motor 3. It is desirable, however, that direct current of low potential be used for driving the control motor 44 for reasons which will be hereinafter explained in detail.

I accordingly prefer to extend the alternating current conductors 21 and 22 by means of taps 45 and 46 into connection with the primary of a transformer 47. The transformer 47 may be protected by means of fuses 48 inserted in the extensions 45 and 46. The secondary of the transformer 47 is preferably connected to a rectifying device 49 so as to provide a low voltage direct current potential across a pair of output terminals 50 and 51. The output terminals 50 and 51 are preferably connected to fuses 52 and one of the fuses is connected by means of a conductor 53 to the aforementioned control motor 44. The motor 44 is preferably of the variable speed reversible type, a split series field motor being illustrated in Fig. 3. When a split series field motor is employed, the conductor 53 is connected to one of the brush or armature leads of the motor. The other brush is internally connected in the motor to one terminal of each of the two series fields.

In order that actuation of the remote control device 16 may result in energizing the motor 44 to operate it in such direction as to insert resistance in the field circuits for the generator 4, I prefer to employ a normally open momentary contact switch button as this control device and connect one terminal thereof to the conductor 53 as by means of a conductor 54. The other terminal of the control switch 16 may be connected as by means of a conductor 55 to a coil 56c of a relay 56, the other terminal of this coil being connected as by means of a conductor 57 to the other of the two fuses 52. It will be observed that closing the circuit between conductors 54 and 55 by operation of the push button 16 will supply current to energize the relay coil 56c.

The conductors 54 and 55 comprise the aforementioned control cable 15 and because this cable will in most instances lie in very close proximity to the welding cable 10, it is preferred to employ the aforementioned transformer 47 and rectifier 49 for the purpose of providing a low voltage direct current which will flow through this control cable. This is for the reason that it is anticipated that the alternating magnetic field which would surround this control cable were alternating current to flow therethrough would affect and might seriously impair the normal functioning of the welding arc.

The energization of the relay coil 56c results in the closing of front or normally open contacts 56f thereof. These contacts are preferably included between the aforementioned conductor 57 and a conductor 58 which is connected through a normally closed limit switch 59 to another conductor 60 which is connected to one terminal of a speed control rheostat 61. The other terminal of the speed control rheostat is connected by means of a conductor 62 to the available terminal of that one of the series fields of the motor 44 which will cause that motor when energized to rotate in such direction as to insert resistance in the field circuits for the generator 4, such direction of rotation being indicated by arrow 63 in Fig. 3.

It will thus be seen that operation of the push button 16 will result in the energization of the relay 56 and thus energize the motor 44 to drive the rheostats 36 and 37 in such direction as to insert resistance in the field circuits of the welding generator 4. As has been pointed out hereinbefore, this results in a gradual reduction in welding current without varying the voltage which is applied across the welding arc.

The rheostats 36 and 37 preferably include sufficient resistance to permit the welding current to be reduced to substantially zero and it will be observed that the rotation of the movable arms of the rheostats will continue as long as the push button 16 is tripped. In order that the rotation may be arrested when the rheostat arms have been moved the full limit of their available travel, I employ the aforementioned normally closed limit switch 59. This switch is so disposed as to be engaged by a switch actuating arm 64 affixed to the rheostat drive shaft 42 and disposed in such position as to open the limit switch contacts 59 when the rheostat arms have been moved to their limits. It will be observed that opening of the limit switch 59 will interrupt the circuit to the motor 44 and thus stop the rotation of the rheostats.

The length of time which should be consumed in reducing the arc current from the normal welding value employed for making the weld to substantially zero depends upon the nature and character of the weld being made and varies from a few seconds up to a half minute. In order that this time may be adjusted to suit the various operating conditions encountered, I employ the aforementioned speed controlling rheostat 61 which may be adjusted to include more or less resistance as desired in the circuit for the motor 44 so as to permit an adjustment of the speed at which this motor operates.

Inasmuch as the rheostats 36 and 37 must again be moved to their zero resistance positions at the time the next welding operation is undertaken by the operator employing the system of my invention, I prefer to provide a means for automatically returning the rheostats to this condition as soon as pressure on the push button 16 is released. This means may include a normally closed or back contact 56b of the relay 56, this contact being connected in series between the aforementioned conductor 57 and a conductor 65 which is in turn connected to a normally closed limit switch 66. The other terminal of the limit switch 66 may be connected by means of a conductor 67 to the other available series field terminal of the driving motor 44.

It will be observed that as soon as pressure is released from the push button 16, the relay coil 56c will be de-energized and a circuit will be completed through the back contacts 56b and the limit switch 66 to energize the driving motor 44 to rotate it in such direction as to remove resistance from the field circuits of the welding generator 4. This operation continues until all of the resistance is removed, the electric motor 44 being de-energized at that time by impingement of the limit switch actuating arm 64 with the limit switch 66 to open the driving circuit for the motor 44. I have not included in this circuit for the motor 44 any speed adjusting device for the reason that it is believed that as soon as the weld has been terminated and the push button 16 released the rheostats should be restored to normal welding condition in as short a time as possible, but it is realized that a speed adjusting device, such as the speed adjusting rheostat 61 may also be employed.

Figure 2:
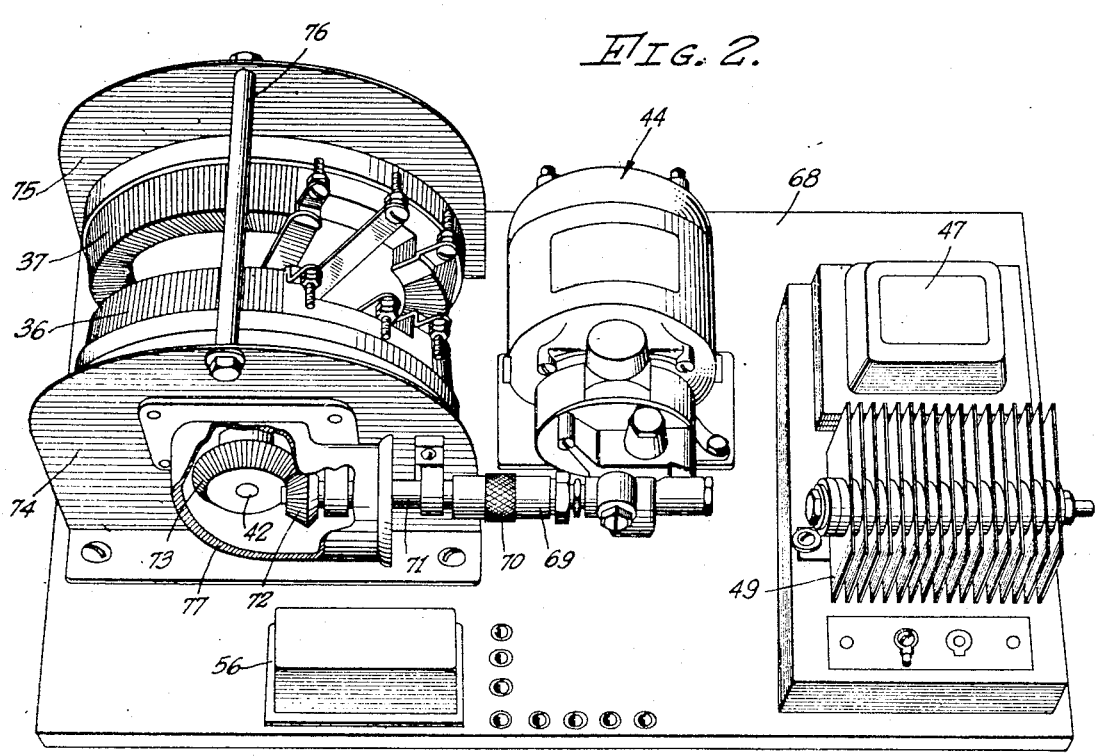
Fig. 2 is a perspective view of the crater eliminating apparatus shown in Fig. 1 with the cover removed.

I have illustrated in Fig. 2 the manner in which the foregoing instrumentalities may be mounted and interconnected with each other. A base 68 is employed upon which is mounted the driving motor 44. The driving motor 44 is preferably of the self-contained gear reduction type which is provided with a relatively low speed drive shaft 69, a speed of around 15 R. P. M. being found suitable for this purpose. The shaft 69 may be coupled as by means of a flexible coupling 70 to a countershaft 71 which is suitably journaled for rotation and which bears upon its outermost end a bevel gear 72. The bevel gear 72 is arranged to mesh with a coacting bevel gear 73 mounted upon the end of the rheostat drive shaft 42 to which the movable arms of the rheostats 36 and 37 are secured, the bevel gears 72 and 73 being of equal diameters or of different diameters if additional speed reduction is desired.

The rheostats 36 and 37 may be each mounted upon its own supporting plate 74 or 75, which plates may be secured to the base member 68 and intertied by means of a bracing interconnection 76 to lend additional rigidity to the structure. The bevel gears 72 and 73 may be enclosed within a suitable cover 77 as desired. The remaining space provided on the base 68 may be employed for the purpose of mounting the transformer 47 and its associated rectifier 49 and for also mounting the relay 56.

In operation the current control lever 6 is set at the current corresponding to the desired welding heat which it is desired to employ in the welding operation. The arc welding is then performed in the usual manner until the end of the bead which is being run is reached. At this time instead of abruptly breaking the arc as by removing the electrode 13 from the workpiece 9, the operator presses the button 16 while advancing the electrode further in the direction of the length of the welded bead and without withdrawing the electrode from the workpiece. As resistance is inserted in the field circuits of the welding generator as a result of operating the control device 16, the current flowing across the welding arc gradually becomes less and less and the heat resulting therefrom reduces correspondingly. Consequently the rate at which the metal of the electrode 12 is deposited gradually reduces and the parent metal immediately adjacent the weld is allowed to gradually cool. Reduction continues until it becomes so low as to permit the arc to extinguish itself, this condition ordinarily being obtained when the current has been reduced to approximately ten percent of the working welding current. Such a low current welding arc is readily maintained between the electrode and the parent metal by reason of the fact that the arc voltage is maintained at its usual normal value of around 20 to 30 volts.

As soon as the arc dies of its own accord the electrode 13 is removed from the vicinity of the workpiece 9 and the pressure on the push button 16 is released so as to permit the crater eliminator to automatically remove from the field circuits of the welding generator 4 the resistance which has been inserted therein, thus placing the welding generator in a condition to resume welding whenever such resumption is desired.

I have illustrated in Figs. 4 and 5 a diagrammatic representation of the nature and character of a welded bead as produced by a conventional arc welding system, Fig. 4 indicating the character of the termination by merely removing the electrode from the work, and Fig. 5 indicating the character of the bead when the arc is terminated by use of the apparatus of my invention.

Referring to Fig. 4 it will be seen that the welding bead which is indicated by the reference character 78 in Fig. 4 is bonded securely along its length to the parent metal 9. I have indicated in Fig. 4 a zone (see 79) wherein an intermixing of the welding electrode material 78 and the parent metal 79 is obtained to afford a strong and uniform bond between the electrode material and the parent metal. Fig. 4 represents a longitudinal section through the welded bead and clearly shows at the termination of the bead a crater 80 which is formed as a result of the abrupt termination of the arc. The parent metal in the vicinity of the crater 80 is porous and impregnated with various inclusions indicated in Fig. 4 by the reference character 81 and the electrode material which is deposited in that region adjacent the crater 80 is also found to be porous and filled with various inclusions 82.

Reference to Fig. 5 will clearly demonstrate the difference in character of the welds at the point of termination. As is clearly shown in Fig. 5 the gradual reduction in heat of the arc at the time the bead is terminated results in a slower cooling of the molten metal so as to permit any gases or bubbles contained within the molten metal to escape before the metal freezes and also protects the molten metal against oxidation so that inclusions of scale and similar impurities is prevented.

When welds are made upon light gauge material such as is employed in the aircraft industry, it has been found that fractures and failures result from imperfections occurring at the end of the welded bead. With such thin metals the crater very often penetrates completely through the thin gauge material so as to provide a hole in the metal at that point. This hole or, if no hole is formed, the porous and poor quality material at the location of the crater serves as a starting point from which fatigue and fractures gradually develop. This fracture results in the general weakening of the joint so that a progressive failure of the piece shortly occurs. It was indicated that the elimination of this crater and the elimination of the poor quality material in the region of the crater by the employment of the crater eliminating device of my invention prevents such progressive failures and results in a welded joint which is actually stronger than the two pieces which are secured to each other thereby.

From the foregoing it will be observed that I have provided a method and an apparatus for preventing the formation of a crater at the termination of an electric welded bead by gradually and uniformly reducing the heat of the welding arc to such a low value as to prevent the formation of a crater at the time the arc is finally interrupted.

It will also be observed from the foregoing that this reduction in arc heat is obtained by reducing the arc current and that the invention provides for ready maintenance of the arc under reduced current conditions by maintaining a constant and sufficiently high voltage across the arc.

It will be understood that craters of the character referred to hereinbefore are formed at the conclusion of a welding operation which is performed in the conventional manner irrespective of whether the actual welding is done manually or by means of an automatic welding machine.

While I have shown and described my invention in connection with a manually operated welding apparatus, it will be readily understood by those skilled in the art that the principles disclosed in the foregoing are equally as applicable to such automatic welding apparatus. This can be readily accomplished by coupling the push button 16 or an equivalent control device to the mechanism of the automatic welding machine in such manner as to cause the crater eliminating device to be placed in operation immediately prior to the conclusion of an automatic welding operation.

While I have shown and described the preferred embodiment of my invention, I do not desire to be limited to any of the details of construction shown or described herein, except as defined in the appended claims.

I claim:

1. The method of preventing the formation of a crater at the conclusion of an electric arc welding operation employing a metallic electrode which comprises maintaining a substantially constant arc length and arc voltage while gradually and uniformly reducing the arc current from a normal value until melting of the electrode substantially stops and the arc breaks of its own accord.

2. The method of preventing the formation of a crater at the conclusion of an electric arc welding operation employing a metallic electrode which comprises maintaining a substantially constant arc length while gradually and uniformly reducing the arc current from a normal welding value to a substantially lower value such that the melting of the electrode substantially stops and the arc breaks of its own accord, and maintaining the voltage across the arc at a substantially constant value during the reduction of the arc current.

3. The method of preventing the formation of a crater at the conclusion of an electric arc welding operation employing a metallic electrode which comprises maintaining a substantially constant arc length while gradually and uniformly reducing the arc current until melting of the electrode substantially stops, continuing the normal progressive movement of the welding arc during said reduction of arc current, and preventing a reduction in voltage across the arc during the time the arc current is being reduced, said reduction being continued until the arc breaks of its own accord.

4. The method of preventing the formation of a crater at the conclusion of an electric arc welding operation employing a metallic electrode wherein the arc current is supplied by a direct current generator, which comprises maintaining a substantially constant arc length while gradually and uniformly reducing the excitation of said generator from a normal welding excitation to a substantially lower value such that the melting of the electrode is substantially stopped and the arc breaks of its own accord and in such fashion as to cause the arc voltage to remain substantially unchanged during said reduction.

5. The method of preventing the formation of a crater at the conclusion of an electric arc welding operation employing a metallic electrode wherein the arc current is supplied by a direct current generator employing shunt and series fields, which consists in maintaining a substantially constant arc length while gradually and uniformly reducing the shunt field excitation of said generator in such fashion as to cause the arc voltage to remain substantially unchanged during said reduction, said reduction being continued until the arc current is reduced to a lower value such that the melting of the electrode substantially stops and the arc is substantially self-extinguishing.

6. In an electric arc welding apparatus to be employed with a metallic electrode including a source of arc welding current, a crater eliminating device comprising: a current control means actuatable to gradually and uniformly reduce the arc current and capable of reducing said arc current from a normal welding value to a lower value such that melting of the electrode substantially stops and the arc is substantially self-extinguishing; control means accessible to a welding operator and operable without interrupting a welding operation to actuate said current control means; and circuit means coupling said current control means to said source and coacting with said current control means to maintain the voltage across an arc of constant length at a substantially constant value during the reduction of said current by actuation of said current control means.

7. In an electric arc welding apparatus to be employed with a metallic electrode including a generator having shunt and series fields for supplying direct current to a welding arc, a crater eliminating device comprising: a current control means connected in circuit with said shunt field actuatable to gradually and uniformly reduce the shunt field excitation of said generator to thereby gradually and uniformly reduce the arc current; control means accessible to a welding operator and operable without interrupting a welding operation to actuate said current control means; and circuit means including said current control means and said shunt field and coacting with said current control means to maintain the voltage across an arc of constant length at a substantially constant value, said current control means having a control range sufficient to reduce the arc current from a normal welding value to a lower value such that the melting of the electrode substantially stops and it is substantially impossible to maintain said arc while maintaining said constant arc length.

8. In an electric arc welding apparatus to be employed with a metallic electrode, a source of arc welding current, a current control means actuatable to gradually and uniformly reduce the arc current and capable of reducing said arc current from normal welding value to a lower value such that melting of the electrode substantially stops and the arc is substantially self-extinguishing; control means accessible to a welding operator and operable without interrupting a welding operation to actuate said current control means; and means associated with said current control means and said source for maintaining the voltage across an arc of constant length at a substantially constant value during the reduction of said current by actuation of said current control means, whereby the arc is extinguished without formation of craters in the weld.

KARL STROBEL.